US007555932B2

(12) United States Patent
Hirose et al.

(10) Patent No.: US 7,555,932 B2

(45) Date of Patent: Jul. 7, 2009

(54) COMBUSTION PRESSURE SENSOR

(75) Inventors: Yoshinobu Hirose, Mie-ken (JP); Takehiro Watarai, Kuwana (JP)

(73) Assignee: Denso Corporation, Kariya (JP)

( * ) Notice: Subject to any disclaimer, the term of this patent is extended or adjusted under 35 U.S.C. 154(b) by 51 days.

(21) Appl. No.: 11/785,916

(22) Filed: Apr. 20, 2007

(65) Prior Publication Data

US 2007/0245806 A1 Oct. 25, 2007

(30) Foreign Application Priority Data

Apr. 20, 2006 (JP) ............................ 2006-116993
Feb. 28, 2007 (JP) ............................ 2007-050256

(51) Int. Cl.
*G01M 15/00* (2006.01)
*G01L 23/22* (2006.01)

(52) U.S. Cl. .................................. 73/35.12; 73/114.18

(58) Field of Classification Search ................ 73/35.07, 73/35.12, 35.13, 114.18, 114.19, 114.16, 73/114.17

See application file for complete search history.

(56) References Cited

U.S. PATENT DOCUMENTS 6,539,787 B1 * 4/2003 Murai et al. ............. 73/114.21
7,171,846 B2 * 2/2007 Sakamoto et al. ........ 73/114.18
7,337,657 B2 * 3/2008 Haussner et al. ......... 73/114.18
2004/0182144 A1 * 9/2004 Okazaki et al. ............ 73/118.1
2005/0061063 A1 3/2005 Haussner et al.
2006/0053875 A1 3/2006 Haussner et al.
2006/0090544 A1 * 5/2006 Yorita et al. ............... 73/35.12
2007/0163329 A1 * 7/2007 Last et al. .................. 73/35.12
2007/0245805 A1 * 10/2007 Schricker et al. ........... 73/35.12
2007/0289370 A1 * 12/2007 Hirose et al. .................. 73/116

FOREIGN PATENT DOCUMENTS

JP 2005-090954 4/2005
JP 2006-084468 3/2006

* cited by examiner

*Primary Examiner*—Helen C. Kwok
(74) *Attorney, Agent, or Firm*—Nixon & Vanderhye, PC

(57) ABSTRACT

A combustion pressure sensor for detecting a pressure in the combustion chamber of an internal combustion engine includes a heat releasing member disposed between a housing and a pressure transmitting member at a position forward of a load detecting section and slidable relative to the pressure transmitting member for releasing heat through heat transfer from combustion gas, which has entered an axial hole of the housing from the combustion chamber, to the housing.

8 Claims, 8 Drawing Sheets

COMBUSTION PRESSURE SENSOR

CROSS REFERENCE TO RELATED APPLICATION

The present application is based on and claims priority from Japanese Patent Applications 2006-116993, filed Apr. 20, 2006 and 2007-050256, filed Feb. 28, 2007, the contents of which are incorporated herein by reference.

BACKGROUND OF THE INVENTION

1. Field of the Invention

The present invention relates to a combustion pressure sensor for detecting a combustion pressure in the combustion chamber of an internal combustion engine such as a diesel engine.

2. Description of the Related Art

Combustion pressure sensors adapted to be mounted to an internal combustion engine such as a diesel engine for detecting the combustion pressure in a combustion chamber of the internal combustion engine are known and used heretofore. In one example disclosed in Japanese Patent Application Publication JP 2005-90954 A (corresponding to US 2005/0061063 A1), the combustion pressure sensor is formed as an integral part of a glow plug. As shown in FIG. 8 hereof, the disclosed combustion pressure sensor 9 includes a pressure transmitting member 91 (serving also as a heating rod) slidably displaceable in the axial direction relative to a housing 92 to transmit a pressure in the combustion chamber to a pressure sensor 93 disposed on a rear end of the combustion pressure sensor 9 for the detection of a combustion pressure in the combustion chamber.

In order to prevent entry of hot combustion gas from between the pressure transmitting member (heating rod) 91 and the housing 92, the combustion pressure sensor 9 further has a seal member 94 and a membrane 95. To this end, the seal member 94 and the membrane 95 are arranged to tightly block or seal a clearance between the pressure transmitting member (heating rod) 91 and the housing 92. The membrane 95 is connected by welding to the housing 92 and the pressure transmitting member 91 so that the hot combustion gas can be trapped within a front end portion of the housing 92.

With this arrangement, however, due to contraction in shape of the housing 99 that may occur in the axial direction of the housing 92 when the combustion pressure sensor 9 is mounted to the internal combustion engine, the pressure transmitting member 91, which is connected to the housing 92 via the membrane 95, is also displaced in the axial direction relative to the housing 92. As a consequence of this displacement, a force or pressure is transmitted to the pressure sensor 93, which will cause an unwanted change in the sensor output. This may lead to fluctuation in the initial value of the combustion pressure sensor 9 and deterioration of the sensor accuracy. To secure application to the engine control purposes, the combustion pressure sensor 9 requires collection using another sensor, which will incur additional cost. In some cases, engine control is rendered difficult to achieve.

Another conventional combustion pressure sensor is disclosed in Japanese Patent Application Publication JP 2006-084468 A2 (corresponding to US 2006/0053875 A1), which includes a seal in the form of a bellows-shaped component provided between the pressure transmitting member (heating rod) and the housing. However, since the seal is disposed in a front end portion of the housing, the seal is likely to cause thermal deterioration under the effect of high-temperature combustion gas. Accordingly, in a severe environment, sealing property between the pressure transmitting member and the housing tends to deteriorate, making it difficult to provide a sufficient level of durability.

SUMMARY OF THE INVENTION

With the foregoing difficulties in view, an object of the present invention is to provide a combustion pressure sensor, which has very good detection accuracy and durability.

According to the invention, there is provided a combustion pressure sensor for detecting a combustion pressure in a combustion chamber of an internal combustion engine, comprising: a hollow cylindrical housing adapted to be mounted to the internal combustion engine in such a manner that a front end portion of the hollow cylindrical housing is located in front of the combustion chamber; a pressure transmitting member slidably inserted through an axial hole of the hollow cylindrical housing such that a pressure receiving front end portion of the pressure transmitting member protrudes from the front end portion of the housing into the combustion chamber for transmitting a combustion pressure in the combustion chamber; a load detecting section disposed between the housing and the pressure transmitting member for detecting variations in load acting between the housing and the load transmitting member; and a heat releasing member disposed between the housing and the pressure transmitting member at a position forward of the load detecting section and slidable relative to the pressure transmitting member for releasing heat through heat transfer from combustion gas, which has entered the axial hole of the housing from the combustion chamber, to the housing.

In the combustion pressure sensor, since the heat releasing member is disposed between the housing and the pressure transmitting member at a position forward of the load detecting section, and since the heat releasing member is arranged to release heat through heat transfer from combustion gas, which has entered the axial hole of the housing from the combustion chamber, to the housing, the head of the combustion gas is released through the housing to the surrounding engine head portion. Thus, the heat of the combustion gas can never reach the rear end side of the combustion pressure sensor, so that the effect of thermal load on the load detecting section can be reduced. The combustion pressure sensor as a whole is highly durable in construction.

Furthermore, the heat releasing member is disposed in a slidable manner relative to the pressure transmitting member, and the pressure transmitting member is slidable relative to the housing. With this arrangement, even when the housing is deformed into axially contracted configuration due to a load acting in the axial direction of the housing when the combustion pressure sensor is mounted to the internal combustion engine, it is possible to prevent a load induced by the deformation of the housing from transmitting to the load detecting section. Especially because the heat releasing member is disposed to be slidable relative to the pressure transmitting member, and because the pressure transmitting member is slidable relative to the housing, a deformation of the housing can never be transferred to a deformation of the pressure transmitting member. As a result, the load detecting section is completely free from the effect of a stress that may occur due to deformation of the housing.

It will be appreciated that in the combustion pressure sensor of the invention, an unwanted change in the sensor output, which might otherwise occur at the time of mounting to the internal combustion engine, can be avoided. The combustion pressure sensor is therefore able to retain the desired detection accuracy. In performing engine control operation, the combustion pressure sensor 1 does not require correction using another sensor, which will incur additional cost.

As thus far described, it is possible according to the present invention to provide a combustion pressure sensor, which has very good detection accuracy and durability.

The term “front side” is used herein to refer to a side of the combustion pressure sensor from which the combustion pressure sensor is inserted in the combustion chamber of the internal combustion engine. Accordingly, the term “rear side” is used herein to refer to a rear side of the combustion pressure sensor, which is opposite to the front side.

Preferably, the pressure-receiving front end portion of the pressure transmitting member contains an internal glow plug having a heating element that generates heat when energized, and an electric conductor means through which electric power is supplied to the heating element. With this arrangement, since a combustion pressure detecting function and a blow plug function can be integrated into a single component, it is possible to achieve cost reduction, space saving, and easy assembly.

The glow plug preferably comprises a ceramic glow plug having a ceramic body and a heating element embedded in the ceramic body. Since the ceramic glow plug has an improved heat resistance property, it is possible to extend the service life of the combustion pressure sensor, which is used in a high temperature environment.

Preferably, the heat releasing member is formed from a material having a thermal conductivity greater than 15 W/mk. In this instance, by virtue of the heat releasing member, heat of the combustion gas, which has entered into the axial hole of the housing, can be efficiently released to the housing. This will achieve efficient reduction of thermal load that is exerted on the load detecting section.

The heat releasing member is preferably made of an elastic material and disposed in a prestressed state between the housing and the pressure transmitting member. The thus arranged heat releasing member insures sufficient heat transfer from the pressure transmitting member to the housing and smooth sliding movement of the pressure transmitting member relative to the housing.

Preferably, the heat releasing member is formed of a metal mesh member. The metal mesh member possesses the necessary degree of thermal conductivity and elasticity that are due for a heat releasing member to be disposed between the pressure transmitting member and the housing.

In one preferred form of the invention, the housing includes a housing body and a housing front end member fixed to a front end of the housing body, and the heat releasing member is disposed on the inside of at least one of the housing body and the housing front end member. This arrangement allows for easy arrangement the heat releasing member between the housing and the pressure transmitting member. Stated more specifically, the heat releasing member is mounted on the inside of either the housing body or the housing front end member while the housing body and the housing front end member are separated from each other. Subsequently, by joining together the housing body and the housing front end member, the heat releasing member can be readily placed between the housing and the pressure transmitting member. The combustion pressure sensor of this construction is easy to manufacture.

The heat releasing member may be disposed on the inside of the housing front end member or on the inside of the housing body. As a further alternative, the heat releasing member may be disposed on the inside of the housing body and the housing front end member across a joint between the housing body and the housing front end member.

The heat releasing member is preferably disposed on the inside of a front end portion of the housing front and member. With the heat releasing member thus arranged, heat of the combustion gas, which has entered between the housing and the pressure transmitting member, is released via the front end portion of the housing to the engine head. This provides further improvement in the heat releasing efficiency, leading to additional reduction of thermal load on the load detecting section.

Preferably, the combustion pressure sensor further includes a seal member that seals a clearance between the housing and the pressure transmitting member at a position rearward of the heat releasing member, the seal member being disposed on the inside of at lest one of the housing body and the housing front end member. By thus providing the seal member, the combustion gas is no longer possible to move into a rearward side of the sensor beyond the seal member. Additionally, since the seal member is disposed behind the heat releasing member, heat of the combustion gas is released by the heat releasing member to the surrounding engine head on the front side of the seal member. By thus releasing the combustion heat, it is possible to suppress deterioration by heat of the seal member. This leads to further improvement in the durability of the combustion pressure sensor.

The seal member may be disposed on the inside of the housing front end member or on the inside of the housing body. As a further alternative, the seal member may be disposed on the inside of the housing body and the housing front end member across a joint between the housing body and the housing front end member.

DETAILED DESCRIPTION OF THE PREFERRED EMBODIMENTS

Figure 1:
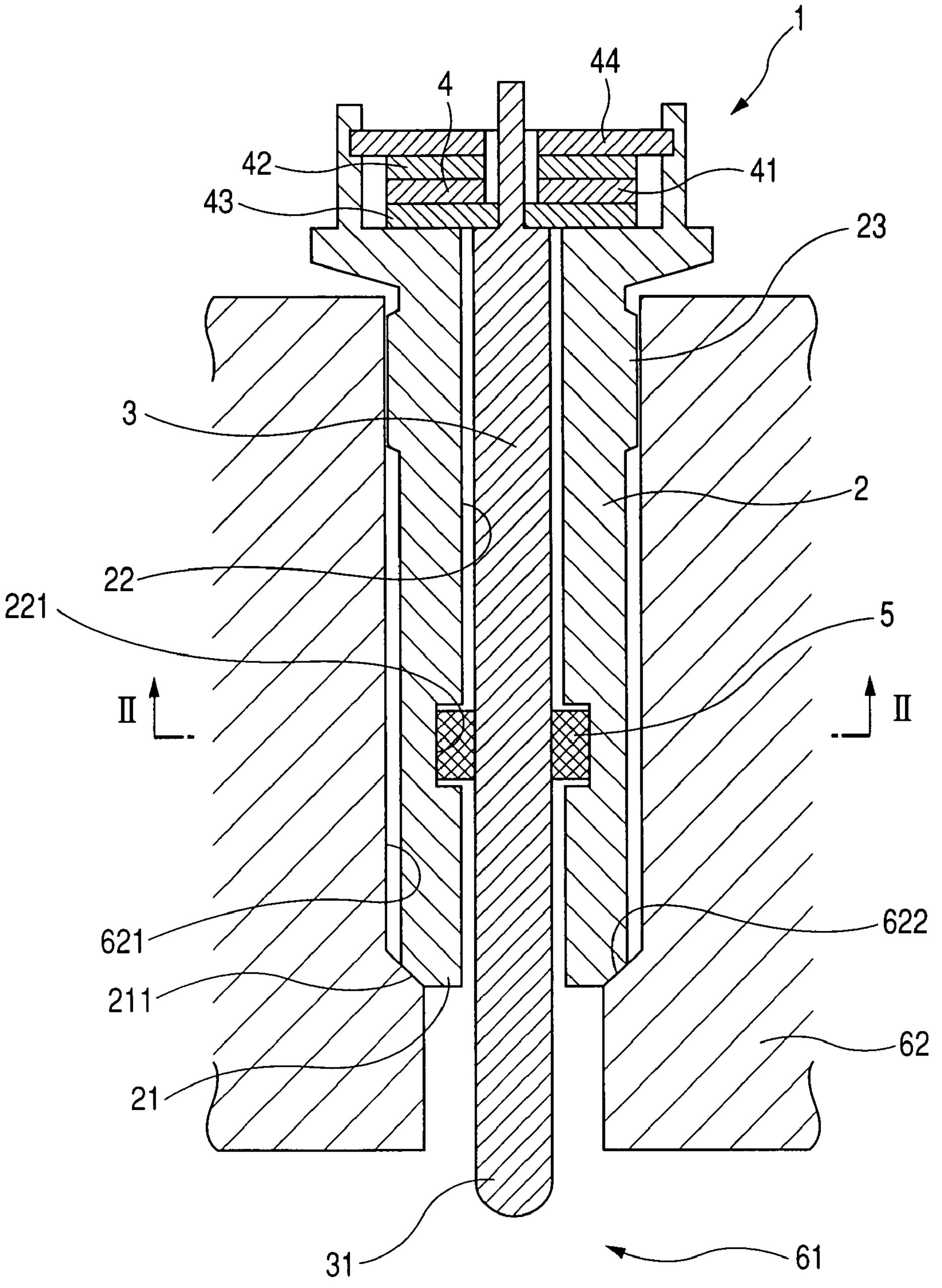
FIG. 1 is a longitudinal cross-sectional view of a combustion pressure sensor according to a first embodiment of the present invention.

Referring now to the drawings and FIG. 1 in particular, there is shown a combustion pressure sensor 1 according to a first embodiment of the present invention. The combustion pressure sensor 1 is used for the detection of the combustion pressure in a combustion chamber 61 of an internal combustion engine such as a diesel engine, and for this purpose it generally comprises a housing 2, a pressure transmitting member 3, a load detecting section 4, and a heat releasing member 5.

The housing 2 is a hollow cylindrical member adapted to be mounted to the internal combustion engine in such a manner that a front end portion 21 of the hollow cylindrical housing 2 is disposed in front of, or directed toward, the combustion chamber 61.

The pressure transmitting member 3 is an elongated rod-like member slidably inserted through an axial hole 22 of the hollow cylindrical housing 2 such that a pressure receiving front end portion 31 of the rod-like pressure transmitting member 3 protrudes from the front end portion 21 of the housing 2 into the combustion chamber 61 for transmitting a combustion pressure in the combustion chamber 61 to the load detecting section 4.

The load detecting section 4 is disposed between the housing 2 and the pressure transmitting member 3 for detecting variations in load acting between the housing 2 and the pressure transmitting member 3.

The heat releasing member 5 is disposed between the housing 2 and the pressure transmitting member 3 at a position forward of the load detecting section 4 and slidable relative to the pressure transmitting member 3 for releasing heat through heat transfer from combustion gas, which has entered the axial hole 22 of the housing 2 from the combustion chamber 61, to the housing 2.

The heat releasing member 5 is formed of a metal mesh member having a thermal conductivity greater than 15 W/mK and a certain degree of elasticity. The elastic heat releasing member 5 is disposed in a prestressed states between the housing 2 and the pressure transmitting member 3. Stated more specifically, the heat releasing member 5 is elastically deformed or distorted in a radially compressed configuration by and between the housing 2 and the pressure transmitting member 3 so that an elastic force acts on both of an inner circumferential wall of the axial hole 22 of the housing 2 and an outer circumferential surface of the rod-like pressure transmitting member 3. The axial hole 22 of the housing 2 has a retainer portion 221 disposed intermediately between a forward end (lower end in FIG. 1) of the housing 2 and a rear end (upper end in FIG. 1) of the housing 2, the retainer portion 211 having a larger diameter than the rest of the axial hole 22. The heat releasing member 5 is held or retained in the retainer portion 221.

Figure 2:
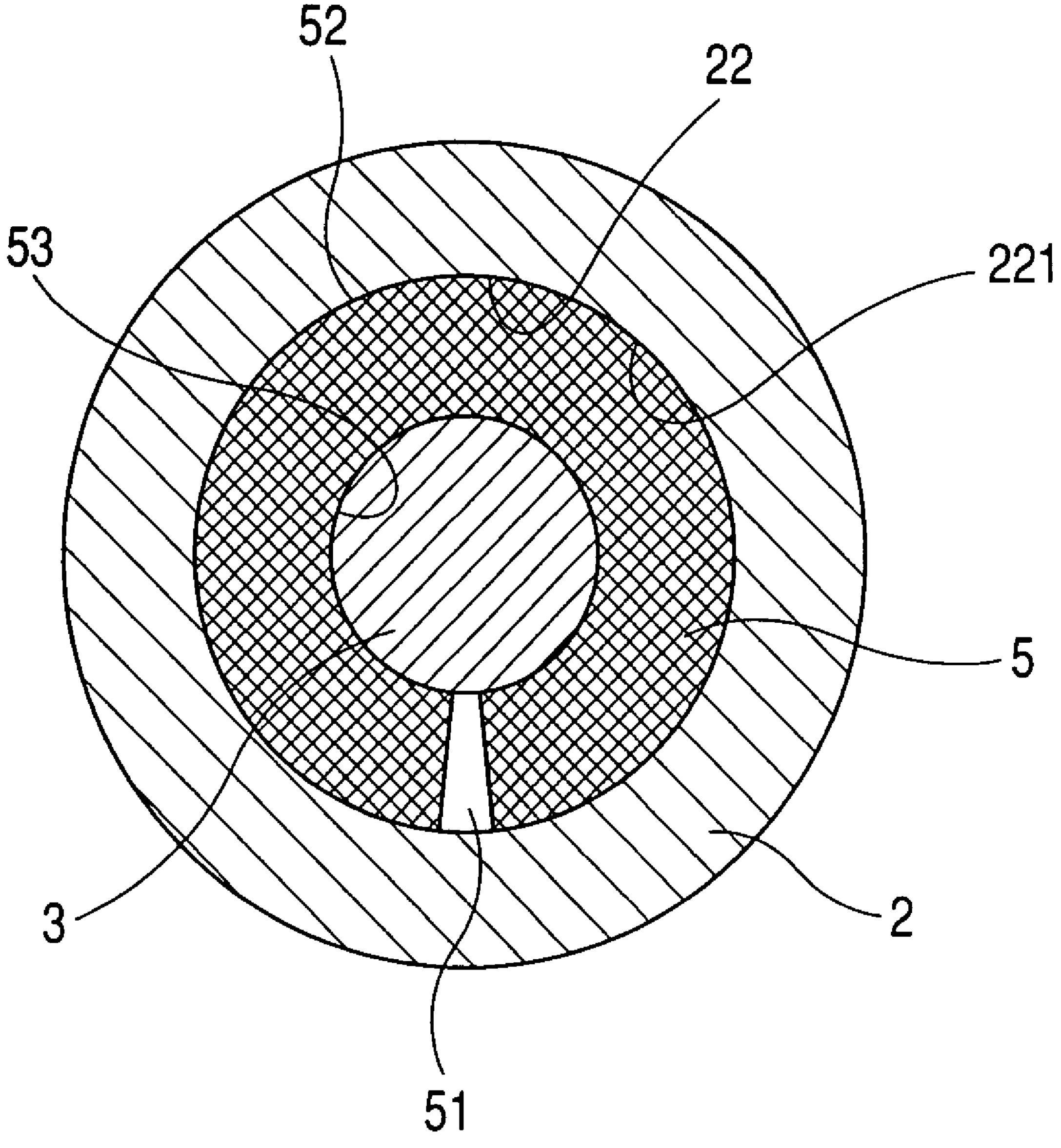
FIG. 2 is a cross-sectional view taken along line II-II of FIG. 1.

As shown in FIG. 2, the heat releasing member 5 is in the form of a circular split ring (C-shaped ring) having an axial slit 51. The ring-like heat releasing member 5 has an outer circumferential surface 52 held in pressure contact with the circumferential wall of the retainer portion 221 of the axial hole 22 of the housing 2, and an inner circumferential surface 53 held in pressure contact with the outer circumferential surface of the pressure transmitting member 3. The degree of elasticity of the heat releasing member 5 is determined such that the heat releasing member 5 can retain sufficient ability to slide relative to the pressure transmitting member 3 while keeping itself in positive contact with the housing 2 and the pressure transmitting member 3.

The heat releasing member 5 is formed from, for example, metal fibers knitted or woven into a mesh structure, which is shaped into a split circular ring (C-shaped ring). The shape of the heat releasing member 5 should by no means be limited to the C shape as in the illustrated embodiment but may include a continuous circular ring-like configuration.

Referring back to FIG. 1, the combustion pressure sensor 1 is inserted through an engine head portion 62 of the internal combustion engine (diesel engine, for example) and firmly secured to the engine head portion 62. The engine head portion 62 has a mounting hole 621 for mounting the combustion pressure sensor 1 to the engine head portion 62. The mounting hole 621 has a tapered portion 622 for abutment with the front end portion 21 of the housing 2 of the combustion pressure sensor 1. The combustion pressure sensor 1 has a beveled portion 211 formed on an outer circumferential surface of the front end portion 21 of the housing 2, and an externally threaded portion 23 formed on the outer peripheral surface of a rear end portion of the housing 2. The engine head portion 62 has an internally threaded portion (not designated) formed on a read end portion (upper end portion in FIG. 1) of a circumferential wall of the mounting hole 621. The externally threaded portion 23 of the housing 2 is threaded with the internally threaded portion of the engine head portion 62 with the beveled portion 211 of the housing front end portion 21 held in abutment with the tapered portion 622 of the mounting hole 621, so that the combustion pressure chamber 1 is mounted to the engine head portion 62.

The load detecting section 4 is formed by a detecting element 41 which produces an electric signal during detection of combustion within the combustion chamber 61, and a pair of electrode plates 42 and 43 disposed in sandwiching relation to the detecting element 41 for taking out the electric signal produced by the detecting element 41. A holder member 44 is disposed on a rear side of the load detecting section 4 (which is directed away from the combustion chamber 61) for holding the load detecting section 4 in position on the rear end of the housing 2. In order to improve the sensitivity of the load detecting section 4 (i.e., to make the load detecting section 4 sensitive to variations in load that may occur during detection of combustion pressure), the detecting element 41 and the electrode plates 42, 43 are initially held under a preload condition with a compressive force or load applied thereto from the holder member 41.

The combustion pressure sensor 1 of the foregoing construction operates as will be discussed below.

The pressure receiving front end portion 31 of the pressure transmitting member 3 is subjected to a combustion pressure generated during combustion of an air-fuel mixture within the combustion chamber 61, whereupon the pressure transmitting member 3 is displaced in the axial direction toward the rear end (upper end in FIG. 1) of the combustion pressure sensor 1, thereby transmitting the combustion pressure to the load detecting section 4. With the combustion pressure thus transmitted, the initial compressive load applied in advance to the load detecting section 4 is caused to vary and the load detecting section 4 generates an output signal corresponding to the transmitted combustion pressure. The detecting element may use a piezoelectric element in which instance since the piezoelectric element produces a voltage or charge corresponding to a change in load applied thereto, the load detecting section 4 is able to produce an output nearly proportional to the combustion pressure.

Heat of high-temperature combustion gas generated during combustion is received by the heat releasing member 5, which in turn transmits via the housing 2 to the engine head portion 62. By thus releasing the head, undue temperature rise within the housing 2 can be avoided.

Various advantageous effects achieved by the combustion pressure sensor 1 of the first embodiment of the present invention will be enumerated as follows.

In the combustion pressure sensor 1, since the heat releasing member 5 is disposed between the housing 2 and the pressure transmitting member 3 at a position forward of the load detecting section 4, and since the heat releasing member 5 is arranged to release heat through heat transfer from combustion gas, which has entered the axial hole 22 of the housing 2 from the combustion chamber 61, to the housing 2, the head of the combustion gas is released through the housing 2 to the surrounding engine head portion 62. Thus, the heat of the combustion gas can never reach the rear end side of the combustion pressure sensor 1, so that the effect of thermal load on the load detecting section 4 can be reduced. The combustion pressure sensor 1 as a whole is highly durable in construction.

Furthermore, the heat releasing member 5 is disposed in a slidable manner relative to the pressure transmitting member 3, and the pressure transmitting member 3 is slidable relative to the housing 2. With this arrangement, even when the housing 2 is deformed into axially contracted configuration due to a load acting in the axial direction of the housing 2 when the combustion pressure sensor 1 is mounted to the internal combustion engine, it is possible to prevent a load induced by the deformation of the housing 2 from transmitting to the load detecting section 4.

Stated more specifically, at the time of mounting the combustion pressure sensor 1 to the engine head portion 62, the combustion pressure sensor 1 is inserted in the mounting hole 621 of the engine head portion 62 and the externally threaded portion 23 of the housing 2 is threaded into the internally threaded portion of the mounting hole 621 until the beveled portion 211 at the front end portion 21 of the housing 2 comes in abutment with the tapered portion 622 of the mounting hole 621. To secure firm and reliable mounting of the combustion pressure sensor 1 to the engine head portion 62, the externally threaded portion 23 is further turned in a tightening direction until the beveled portion 211 of the housing 2 exerts a certain force or pressure on the tapered portion 622 of the engine head portion 62. With this tightening of the threaded portion 23, it may occur that the housing 2 slightly deforms in an axially contracted configuration at its axial portion extending between the externally threaded portion 23 and the beveled portion 211.

In this instance, however, since the heat releasing member 5 is disposed in a slidable manner relative to the pressure transmitting member 3 and since the pressure transmitting member 3 is slidable relative to the housing 2, a deformation of the housing 2 can never be transferred to a deformation of the pressure transmitting member 3. As a result, the load detecting section 4 is completely free from the effect of a stress that may occur due to deformation of the housing 2.

It will be appreciated that in the combustion pressure sensor 1 of the invention, an unwanted change in the sensor output, which might otherwise occur at the time of mounting to the engine head portion 62, can be avoided. The combustion pressure sensor 1 is therefore able to retain the desired detection accuracy. In performing engine control operation, the combustion pressure sensor 1 does not require correction using another sensor, which will incur additional cost.

Furthermore, by virtue of the thermal conductivity greater than 15 W/mk, the heat releasing member 5 can effectively release heat of the combustion gas, which has entered into the axial hole 22 of the housing 2, to the housing 2. By thus releasing the combustion heat, the thermal load on the load detecting section 4 can be effectively reduced.

Moreover, since the heat releasing member 5 is made of an elastic material and disposed in a prestressed state (or radially compressed condition) between the housing 5 and the pressure transmitting member 5. The thus arranged heat releasing member 5 insures sufficient heat transfer from the pressure transmitting member 3 to the housing 2 and smooth sliding movement of the pressure transmitting member 3 relative to the housing 2.

Yet, the heat releasing member is formed of a metal mesh member and hence is able to possess the necessary degrees of thermal conductivity and elasticity that are due for a heat releasing member 5 to be disposed between the pressure transmitting member 3 and the housing 2.

It will be appreciated that the combustion pressure sensor 1 according to the first embodiment of the present invention excels in detection accuracy and durability.

Figure 3:
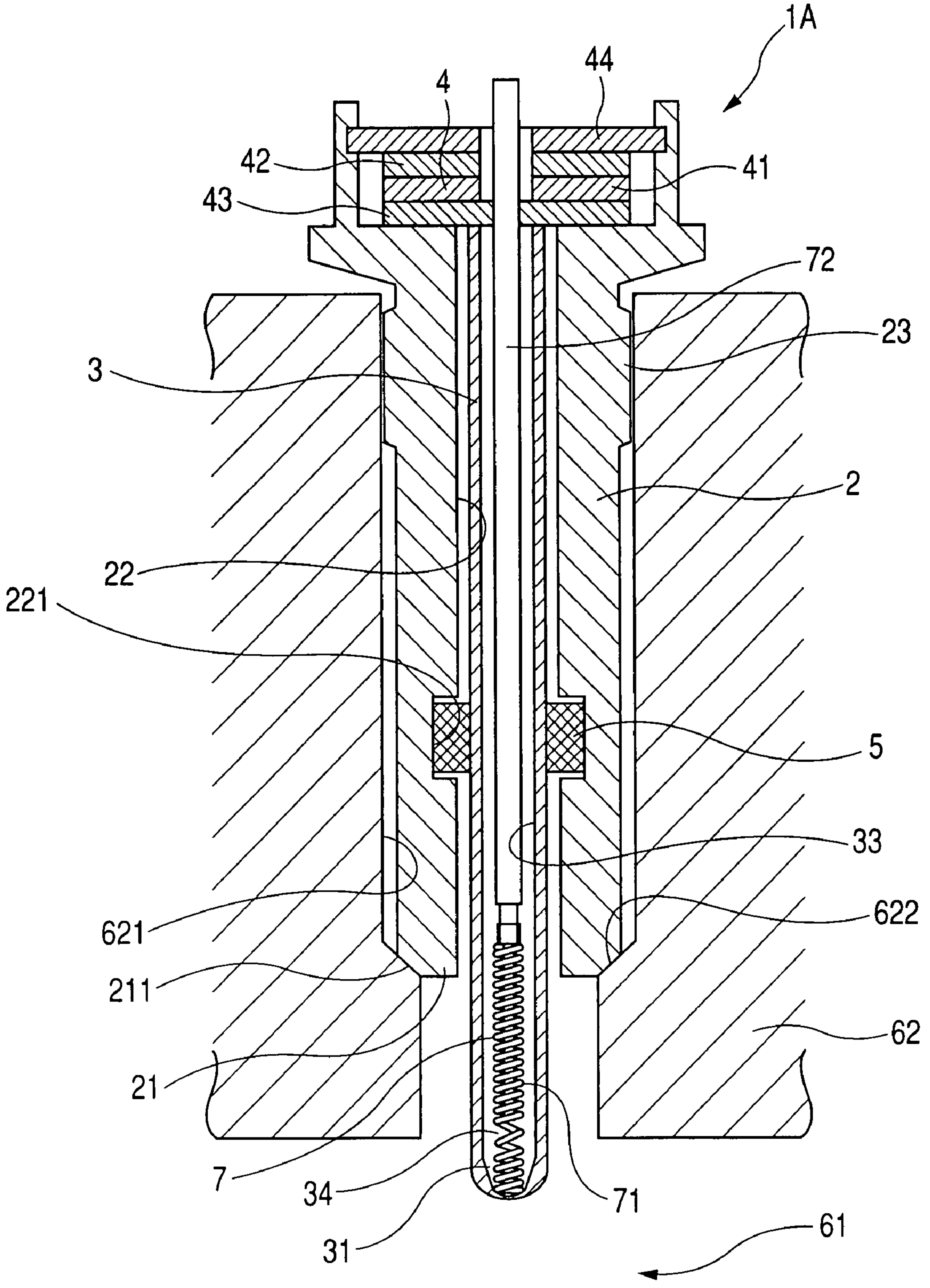
FIG. 3 is a longitudinal cross-sectional view of a combustion pressure sensor according to a second embodiment of the present invention.

FIG. 3 shows in longitudinal cross section a combustion pressure sensor 1A of the type including a build-in or internal glow plug 7 according to a second embodiment of the present invention.

The glow plug 7 includes a heating element 71 that generates heat when energized, and a lead wire 72 forming an electric conductor means through which electric power is supplied to the heating element 71. The heating element 71 is disposed inside a pressure receiving front end portion 31 of a pressure transmitting member 3, and the lead wire 72 connected at one end to a rear end (upper end in FIG. 3) of the heating element 71. A front end (lower end in FIG. 3) of the heating element 71 is electrically connected to the pressure transmitting member 3 and eventually grounded through the heat releasing member 5, housing 2 and engine head portion 62.

The heating element 71 and lead wire 71 of the glow plug 7 are received in an axial hollow internal portion 33 of the pressure transmitting member 3. The hollow internal portion 33 is filled with an insulating material 34 that provides an electric insulation between the heating element 71 and the pressure transmitting member 3 except for the respective front ends (lower ends in FIG. 3) where the heating element 3 and the pressure transmitting member 3 are electrically connected together.

With this arrangement, when the glow plug 7 is energized, the heating element 71 generates heat to thereby increase the ambient temperature within the combustion chamber 61 via the pressure transmitting member 3.

Other structural parts of the combustion pressure sensor 1A of the second embodiment are the same as those of the combustion pressure sensor 1 of the first embodiment described above with reference to FIGS. 1 and 2, and further description thereof can be omitted.

In the second embodiment shown in FIG. 3, since a combustion pressure detecting function and a glow plug function are integrated into a single component, it is possible to achieve substantive cost reduction, space saving, and easy assembly.

The combustion pressure sensor 1A of the second embodiment is also able to achieve the same advantageous effects as those described with reference to the first embodiment shown in FIGS. 1 and 2.

Figure 4:
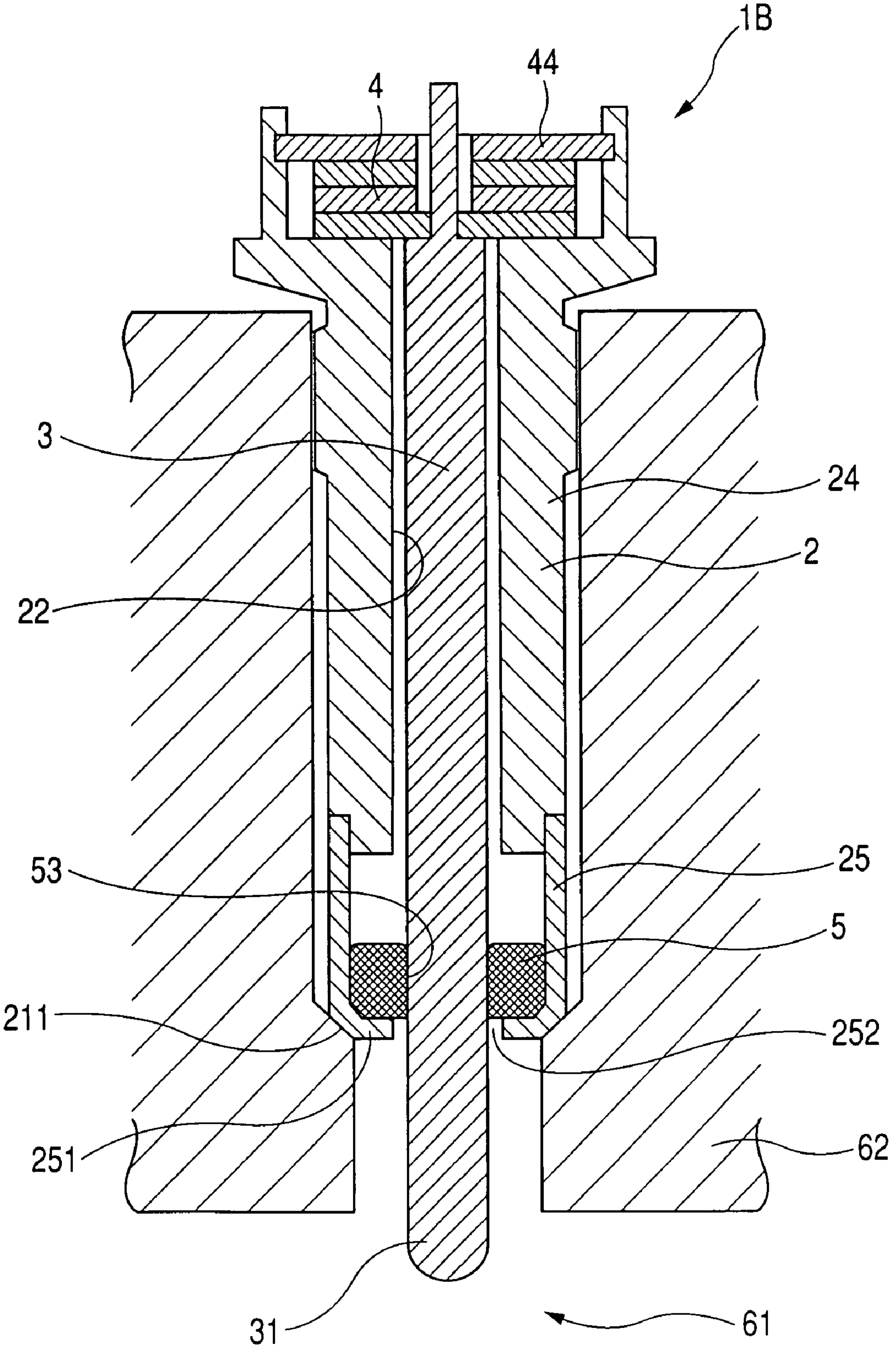
FIG. 4 is a longitudinal cross-sectional view of a combustion pressure sensor according to a third embodiment of the present invention.

FIG. 4 shows in longitudinal cross section a combustion pressure sensor 1B according to a third embodiment of the present invention. The combustion pressure sensor 1B differs from the sensor 1 of the first embodiment shown in FIGS. 1 and 2 in that the housing 2 is formed by a housing body 24 and a housing front end member 25 fixed to a front end (lower end in FIG. 4) of the housing body 24, and the heat releasing member 5 is disposed inside the housing front end member 25.

The housing front end member 25 has an outside diameter substantially equal to an outside diameter of the housing body 24, and an inside diameter larger than the diameter of the axial hole 22 formed in the housing body 24. The housing front end member 25 has a front end portion (lower end portion in FIG. 4) bent in a radial inward direction to form an annular retaining portion 251 for retaining thereon the heat releasing member 5. The annular retaining portion 251 has a central hole 252 formed therein in axial alignment with the axial hole 22 of the housing body 24 and having the same diameter as the axial hole 22. The outer circumferential surface of the annular retaining portion 251 has a beveled front end portion 211.

The heat releasing member 5 is firmly retained on the retaining portion 251 within the housing front end member 25 while an inner circumferential surface 53 of the ring-shaped heat releasing member 5 is held in sliding contact with the outer circumferential surface of the rod-like pressure transmitting member 3 under the elasticity of the heat releasing member 5. Thus, the heat releasing member 5 is disposed inside the front end portion (lower end portion in FIG. 4) of the housing front end member 25. The housing front end member 25 is connected at its rear end portion (upper end in FIG. 4) to the housing body 24 by welding, for example.

Other structural parts of the combustion pressure sensor 1B of the third embodiment are the same as those of the combustion pressure sensor 1 of the first embodiment described above with reference to FIGS. 1 and 2 and further description thereof can be omitted.

In the third embodiment shown in FIG. 4, it is possible to provide the heat releasing member 5 between the housing 2 and the pressure transmitting member 3 without difficulty. Stated more specifically, at a first step of assembly, the heat releasing member 5 is disposed inside the housing front end member 25 while the housing front end member 25 is standing along as a separate part which is structurally independent from the housing body 24. Then, the housing body 24 and the housing front end member 25 are brought together while the pressure transmitting member 3 is extending through the axial hole 22 of the housing body 24, a central hole of the ring-shaped heat releasing member 5, and the central hole 252 of the housing front end member 25. While keeping this condition, the housing body 24 and the housing front end member 25 are joined together by welding. With this arrangement, it is readily possible to arrange the heat releasing member 5 between the housing 2 and the pressure transmitting member 3. The combustion pressure sensor 1B having a two-piece housing 2 is easy to manufacture.

Furthermore, since the heat releasing member 5 disposed inside the front end portion of the housing front end member 25 is able to release heat of the combustion gas from the front end portion of the housing 2 to the engine head portion 62, the heat releasing efficiency of the combustion pressure sensor 1 is very high and the thermal load on the load detecting section 4 decreases further.

Obviously, the combustion pressure sensor 1B of the third embodiment is also able to achieve the same advantageous effects as those described with reference to the first embodiment shown in FIGS. 1 and 2.

Figure 5:
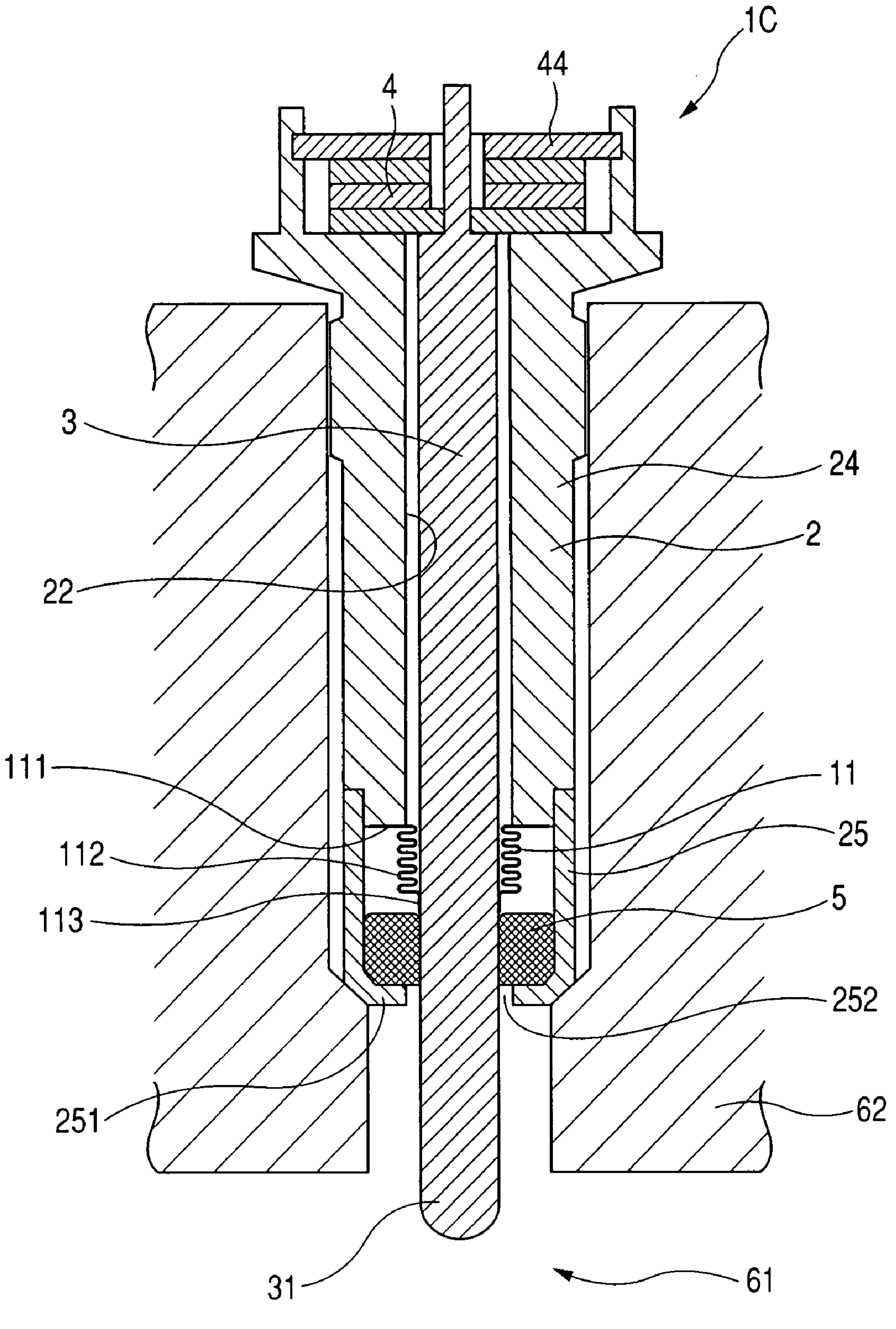
FIG. 5 is a longitudinal cross-sectional view of a combustion pressure sensor according to a fourth embodiment of the present invention.

FIG. 5 shows in longitudinal cross section a combustion pressure sensor 1C according to a fourth embodiment of the present invention, which is different from the combustion pressure sensor 1B of the third embodiment shown in FIG. 4 in that a seal member 11 is arranged to seal a clearance between the housing 2 and the pressure transmitting member 3 at a position rearward (upward of FIG. 5) of the heat releasing member 5 within the housing front end member 25.

The seal member 11 has an annular fixed end portion (rear end portion) 111 firmly connected to a front end face (lower end face in FIG. 5) of the housing body 24, and a generally hollow cylindrical body portion 112 extending from an inner peripheral edge of the annular fixed end portion 111 toward the heat releasing member 5 in confronting relation to the outer circumferential surface of the pressure transmitting member 5. The body portion 112 is in the form of a bellows and has a tubular free end portion (front end portion) 113 opposite to the fixed end portion 111 of the seal member 11. The free end portion 113 is in sealing contact with the outer circumferential surface of the pressure transmitting member 3, so that the clearance between the housing 2 and the pressure transmitting member 3 is closed.

In practice, the free end portion 113 of the seal member 11 may be either in direct contact with, or slightly separated from, the outer circumferential surface of the pressure transmitting member 3. In the latter case, however, a clearance formed between the free end portion 113 of the seal member 11 and the outer circumferential surface of the pressure transmitting member 3 must be small enough to prevent passage therethrough of the combustion gas so as not to allow the entry of the combustion gas beyond the seal member 11. As a further alternative, the free end portion (front end portion) 113 of the seal member 11 may be connected to the pressure transmitting member 5 in which instance, since the bellows-shaped body portion 112 of the seal member 11 can be extended and contracted in the axial direction thereof, the seal member 11 does not obstruct movement of the pressure transmitting member 5 in the axial direction. The seal member 11 may be made of stainless steel.

Other structural parts of the combustion pressure sensor 1C of the fourth embodiment are the same as those of the combustion pressure sensor 1B of the third embodiment described above with reference to FIG. 4 and further description thereof can be omitted.

In the fourth embodiment shown in FIG. 5, the seal member 11 effectively prevents the combustion gas from entering a rear side of the combustion pressure sensor 1C beyond the seal member 11. Additionally, since the seal member 11 is disposed behind the heat releasing member 5 as viewed from the combustion chamber 61, it is possible to release the heat of the combustion gas to the surrounding engine head portion 62 on the front side of the seal member 11. By thus releasing the combustion heat, it is possible to suppress deterioration by heat of the seal member 11. This leads to further improvement in the durability of the combustion pressure sensor 1C.

Obviously, the combustion pressure sensor 1C of the fourth embodiment is also able to achieve the same advantageous effects as those described with reference to the first embodiment shown in FIGS. 1 and 2.

Figure 6:
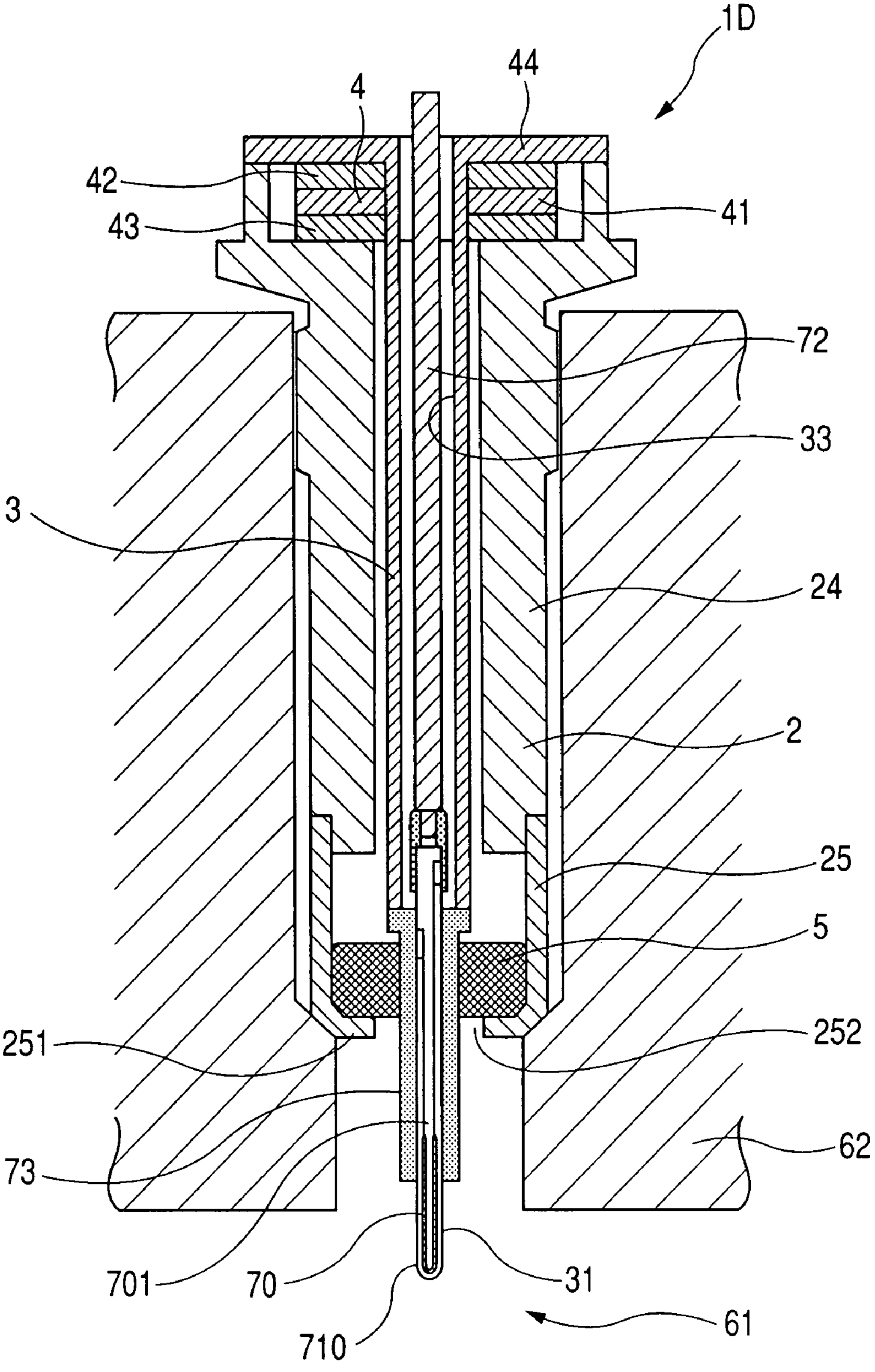
FIG. 6 is a longitudinal cross-sectional view of a combustion pressure sensor according to a fifth embodiment of the present invention.

FIG. 6 shows in longitudinal cross section a combustion pressure sensor 1D according to a fifth embodiment of the present invention. The combustion pressure sensor 1D of this embodiment differs from the combustion pressure sensor 1B of the third embodiment shown in FIG. 4 in that the pressure transmitting member 3 has a built-in or internal ceramic glow plug 70.

The ceramic glow plug 70 has a ceramic body 701 and a heating element 710 embedded in the ceramic body 701. The heating element 710 has a negative terminal connected to a hollow cylindrical glow holder 73 and eventually grounded via the pressure transmitting member 3, heat releasing member 5, housing 2 and engine head portion 62. The positive terminal of the heating element 710 is connected to an end of a lead wire 72 disposed in an axial hollow interior portion 33 of the pressure transmitting member 3. The lead wire 72 forms an electric conductor means through which electric power is supplied to the heating element 710.

The load detecting section 4 of the combustion pressure sensor 1D is held by a holder member 44 from the rear end side of the sensor 1D, in the same manner as the first embodiment shown in FIGS. 1 and 2. The holder member 44 holds the load detecting section 4 in such a manner that the detecting element 41 and the electrode plates 42, 43 are initially loaded with a compressive force or load so as to improve the sensitivity of the load detecting section 4. The holder member 44 is integral with the pressure transmitting member 3. More particularly, the holder member 44 is formed integrally with a rear end (upper end in FIG. 6) of the pressure transmitting member 3. The holder member 44 has an outer peripheral edge portion firmly connected to the rear end of the housing 2.

With this arrangement, when a pressure receiving front end portion 31 of the pressure transmitting member 3 is subjected to a combustion pressure in the combustion chamber 61, the preloaded compressive load on the load detecting section 4 decreases. By detecting a change in the compressive load, the load detecting section 4 produces an output signal corresponding to the combustion pressure in the combustion chamber 61.

Other structural parts of the combustion pressure sensor 1D of the fifth embodiment are the same as those of the combustion pressure sensor 1B of the third embodiment described above with reference to FIG. 4 and further description thereof can be omitted.

In the fifth embodiment shown in FIG. 6, since a combustion pressure detecting function and a glow plug function are integrated into a single component, it is possible to achieve substantive cost reduction, space saving, and easy assembly, as in the same manner as the second embodiment shown in FIG. 3. Furthermore, since the ceramic glow plug 70 is highly resistant to heat, the combustion pressure sensor 1D incorporating such highly heat-resistant ceramic glow plug 70 can exhibit a prolonged service life in a high-temperature ambient.

Obviously, the combustion pressure sensor 1D of the fifth embodiment is also able to achieve the same advantageous effects as the third embodiment shown in FIG. 4.

Figure 7:
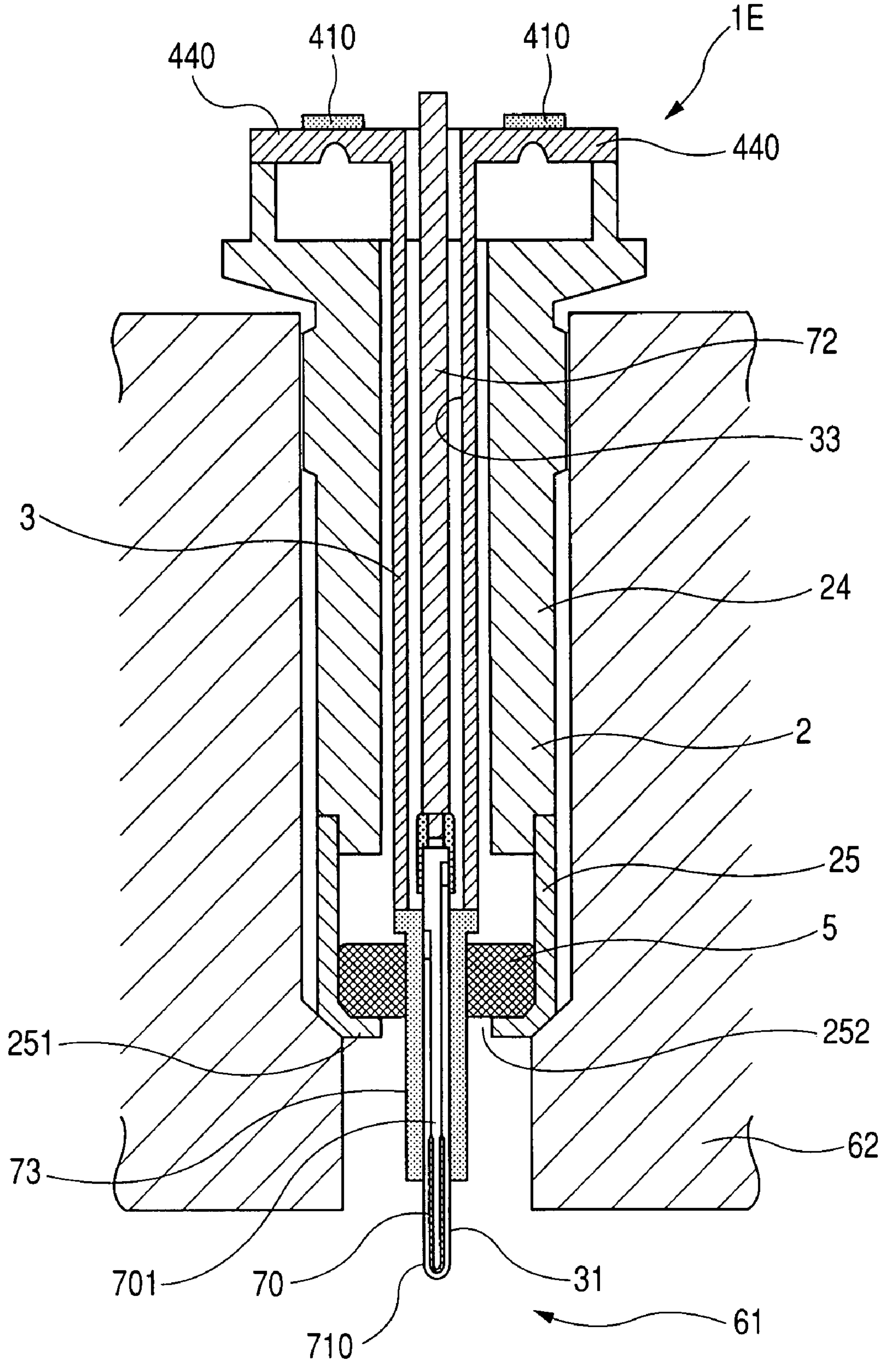
FIG. 7 is a longitudinal cross-sectional view of a combustion pressure sensor according to a sixth embodiment of the present invention.
Figure 8:
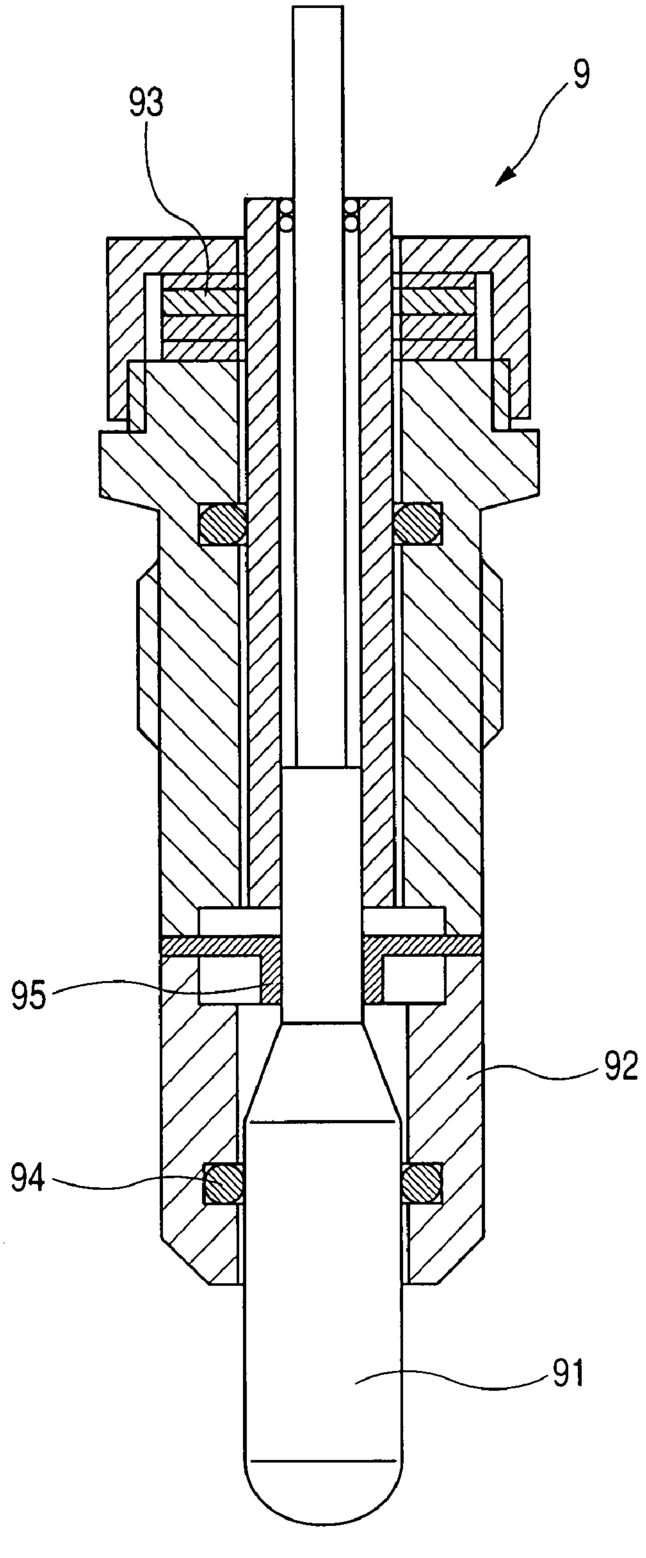
FIG. 8 (PRIOR ART)
FIG. 8 is a longitudinal cross-sectional view of a conventional combustion pressure sensor.

FIG. 7 shows in longitudinal cross section a combustion pressure sensor 1E according to a sixth embodiment of the present invention. The combustion pressure sensor 1E of this embodiment is structurally the same as the combustion pressure sensor 1D of the fifth embodiment shown in FIG. 7 with the exception that the load detecting section 4 employs strain gages 410.

The load detecting section 4 is formed by an annular disc-like support portion 440 formed integrally with a rear end portion (upper end portion in FIG. 7) of the pressure transmitting member 3, and a strain gage 410 adhered or cemented in an appropriate pattern to a rear end face of the support portion 440. The supporting portion 40 has an outer peripheral edge portion firmly secured to the rear end of the housing 2. The strain gage 410 may be a resistance strain gage consisting of a material of strip that is cemented to a part of the support portion under measurement and that changes in resistance with elongation or compression (or a change in length of the strip) under strain to measure pressure applied thereto.

With this arrangement, when combustion pressure in the combustion chamber 61 is transmitted by the pressure transmitting member 3 to the load detecting section 4, the support portion 440 strains or becomes distorted. Strain of the support portion 440 is detected by the strain gage 410 with the result that the combustion pressure in the combustion chamber 61 can be detected by the combustion pressure sensor 1E.

Other structural parts of the combustion pressure sensor 1E of the sixth embodiment are the same as those of the combustion pressure sensor 1D of the fifth embodiment described above with reference to FIG. 6 and further description thereof can be omitted.

The combustion pressure sensor 1E of the sixth embodiment also has exhibits excellent detection accuracy and durability.

It will be appreciated that the combustion pressure sensor 1E of the sixth embodiment is also able to achieve the same advantageous effects as the fifth embodiment shown in FIG. 6.

Obviously, various minor changes and modifications are possible in the light of the above teaching. It is to be understood that within the scope of the appended claims the present invention may be practiced otherwise than as specifically described.

What is claimed is:

1. A combustion pressure sensor for detecting a combustion pressure in a combustion chamber of an internal combustion engine, comprising:

a hollow cylindrical housing adapted to be mounted to the internal combustion engine in such a manner that a front end portion of the hollow cylindrical housing is located in front of the combustion chamber;

a pressure transmitting member slidably inserted through an axial hole of the hollow cylindrical housing such that a pressure receiving front end portion of the pressure transmitting member protrudes from the front end portion of the housing into the combustion chamber for transmitting a combustion pressure in the combustion chamber;

a load detecting section disposed between the housing and the pressure transmitting member for detecting variations in load acting between the housing and the load transmitting member; and a heat releasing member disposed between the housing and the pressure transmitting member at a position forward of the load detecting section and slidable relative to the pressure transmitting member for releasing heat through heat transfer from combustion gas, which has entered the axial hole of the housing from the combustion chamber, to the housing, wherein the heat releasing member is made of an elastic material and disposed in a prestressed state between the housing and the pressure transmitting member.

2. A combustion pressure sensor according to claim 1, wherein the pressure-receiving front end portion of the pressure transmitting member contains an internal glow plug having a heating element that generates heat when energized, and an electric conductor through which electric power is supplied to the heating element.

3. A combustion pressure sensor according to claim 2, wherein the glow plug comprises a ceramic glow plug having a ceramic body and a heating element embedded in the ceramic body.

4. A combustion pressure sensor according to claim 1, wherein the heat releasing member is formed from a material having a thermal conductivity greater than 15 W/mk.

5. A combustion pressure sensor according to claim 1 wherein the heat releasing member is formed of a metal mesh member.

6. A combustion pressure sensor according to claim 1, wherein the housing includes a housing body and a housing front end member fixed to a front end of the housing body, and the heat releasing member is disposed on an inside of at least one of the housing body and the housing front end member.

7. A combustion pressure sensor according to claim 6, wherein the heat releasing member is disposed on an inside of a front end portion of the housing front end member.

8. A combustion pressure sensor according to claim 6, further comprising a seal member that seals a clearance between the housing and the pressure transmitting member at a position rearward of the heat releasing member, the seal member being disposed on an inside of at least one of the housing body and the housing front end member.

* * * * *